US 7,739,586 B2

(12) United States Patent
Suver et al.

(10) Patent No.: US 7,739,586 B2
(45) Date of Patent: Jun. 15, 2010

(54) ENCODING OF MARKUP LANGUAGE DATA

(75) Inventors: Christopher Allen Suver, Seattle, WA (US); Joel M. Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 11/207,547

(22) Filed: Aug. 19, 2005

(65) Prior Publication Data

US 2007/0044012 A1    Feb. 22, 2007

(51) Int. Cl.
*G06F 15/00* (2006.01)
*G06F 13/00* (2006.01)

(52) U.S. Cl. .................. 715/205; 715/234; 715/255; 719/320

(58) Field of Classification Search .......... 715/234, 715/202, 239, 242, 249, 255, 760; 707/1, 707/4, 100–102; 718/100, 101; 719/320, 719/328, 331, 332
See application file for complete search history.

(56) References Cited

U.S. PATENT DOCUMENTS

| | | | | |
|---|---|---|---|---|
| 4,553,205 | A * | 11/1985 | Porchia | 717/136 |
| 5,715,453 | A * | 2/1998 | Stewart | 715/207 |
| 5,737,592 | A * | 4/1998 | Nguyen et al. | 707/4 |
| 5,946,697 | A * | 8/1999 | Shen | 715/205 |
| 6,105,043 | A * | 8/2000 | Francisco et al. | 715/234 |
| 6,260,031 | B1 * | 7/2001 | Schaffer et al. | 706/13 |
| 6,427,228 | B1 * | 7/2002 | Wigger | 717/111 |
| 6,832,368 | B1 * | 12/2004 | Zimowski | 717/139 |
| 6,941,337 | B2 * | 9/2005 | Casais | 709/202 |
| 7,249,328 | B1 * | 7/2007 | Davis | 715/853 |
| 7,251,809 | B2 * | 7/2007 | Barclay et al. | 717/128 |
| 7,571,431 | B2 * | 8/2009 | Hampapuram et al. | 717/141 |
| 2003/0106022 | A1 * | 6/2003 | Goodacre et al. | 715/513 |
| 2003/0145310 | A1 * | 7/2003 | Thames et al. | 717/123 |
| 2004/0205668 | A1 * | 10/2004 | Eastlake, III | 715/531 |
| 2006/0100858 | A1 * | 5/2006 | McEntee et al. | 704/10 |

FOREIGN PATENT DOCUMENTS

WO    WO 9806028    * 12/1998

OTHER PUBLICATIONS

M. Tomassini, MAC2—A Macro Processor for Modula-2, Journal of Pascal, ADA & Modula-2, Jan./Feb. 1990, pp. 28-34.*

* cited by examiner

*Primary Examiner*—Laurie Ries
*Assistant Examiner*—Maikhanh Nguyen
(74) *Attorney, Agent, or Firm*—Woodcock Washburn LLP

(57) ABSTRACT

Markup-language documents are converted into compacted markup-language form by using a number of parameterized macros. A parameterized macro takes at least one parameter. When compacting markup-language documents, a sequence of elements is replaced by references to a macro and to parameter(s), where the macro, when used with the parameters, yields the sequence of elements. The macros used may either be predetermined, from a static dictionary, may be generated on the fly, or mix of both. The definitions of macros may be included in the compacted markup-language information in order to allow a recipient of the compacted markup-language information to expand the macro reference and parameter(s) into the sequence of elements which had been replaced.

17 Claims, 4 Drawing Sheets

ENCODING OF MARKUP LANGUAGE DATA

BACKGROUND

When data is transmitted between a sender and a recipient (e.g. a server and a client) over a network, both the sender and recipient must know the format of the data being transmitted before the transmission takes place. For example, if the sender sends data in a form for a specific database, in order to use the data, the recipient must know what the database format being used is, and must know details about that format. If the recipient does not know what format was being used or the details of that format, data sent properly on the sender's end would be unrecognizable on the recipient's end.

As an example, a database format may comprise a series of records, where each record contains a record number of a certain size, followed by a last name field of a certain size, a first name field of a certain size, and a date field of a certain size. A header might precede these records. However, even if the sender sends data adhering perfectly to the format, unless the recipient knows the format, there is no way for the recipient to understand the data correctly.

To ensure that both the sender and the recipient have the necessary information about format, often they need to be running not only the same application, but the same version of the application. For example, if a sender sent data from a newer version of a database application to a recipient running an older version, the recipient's version may not recognize the format and as discussed above data may be lost or useless.

To help solve these problems and increase flexibility in transmissions, extensible markup language (XML), a markup language based on Standard Generalized Markup Language (SGML), was developed. A markup language is a language that allows content to be provided along with meta-content such as style, syntax, and semantic information in a structured way. XML is termed extensible because it is not a fixed format markup language. HTML (hypertext markup language) is a fixed format markup language, defining one format. Rather, XML is a markup language which is actually a metaformat, a language which allows the user to describe other formats. This allows a user to design a markup language and then to express it in XML. Thus XML provides a flexible standardized data storage format that allows flexibility in format and thus can facilitate interaction between sender and recipient even in the absence of pre-agreement on a strict format. To accomplish this, XML uses a text based tag system similar to (HTML) to describe and store data in a structured manner. For example, a database entry for an employee record might be represented in XML format as follows:

<employee>
    <firstname>John</firstname>
    <lastname>Smith</lastname>
  </employee>

This XML data includes two kinds of elements—tag elements, which begin and end with angled brackets (e.g. start tags such as "<firstname>" and end tags such as "</firstname>") and data elements, (e.g. "John"). As shown, in an XML document, start and end tags can be nested within other start and end tags. All elements that occur within a particular element have their start and end tags occur before the end tag of that particular element. This defines a tree-like structure.

The example XML above includes data elements "John" and "Smith" but also includes information (in the tag elements) indicating that data element "John" is a firstname, and that it is also part, along with lastname "Smith" of an employee record. If a sender transmits this XML file, any applications that recognize XML would be able to read this employee record, retrieve the data and understand its components.

While XML does not require a recipient to know which file format is being used and the details of the file format, it does have drawbacks. First, the file being sent is extremely bulky due to the large amount of tag elements used to describe the data. In fact, XML files can average a size of 2-10 times larger than a normal data file. These larger file sizes slow down the transmission time of data being sent and also require longer processing times. Therefore, transmitting and consuming XML can be very expensive.

To balance the competing interests of flexibility with faster transmission and small file size, some techniques referred to as binary XML can be used. Although the different binary XML techniques may vary depending on the techniques involved, two features are common in each binary XML format.

First, binary XML formats stream binary values rather than character-based values. Second, binary XML formats "tokenize" the XML tags by replacing the tag with a shorter token. For example, a binary XML format could assign the following binary representations for the tags shown above:

1: <employee>
  2: </employee>
  3: <firstname>
  4: </firstname>
  5: <lastname>
  6: </lastname>
  The record shown above could then be rendered as:
  1 3 John 4 5 Smith 6 2

(The numbers shown above would be rendered in binary form; indentation is not meaningful but merely used to enhance comprehension when the markup-language document is displayed.) The substitution of such token representations for the text based tag results in a compressed file can yield an XML file which may be one-quarter or one-third of the size of the original XML file. The tokenization of tags occurs either according to a certain pre-defined token/tag substitutions (known to both sender and recipient, known as a "static dictionary") or according to definitions which are sent as part of the file transmitted (such transmitted definitions known as a "dynamic dictionary")

Although the file size is smaller, there are still drawbacks to binary XML techniques. First, there may be redundant substitutions which make the technique inefficient. For example, if a number is used as a tag in an uncompressed XML file, it may be encoded to a different number and then must be decoded, for no savings in space but a cost in encoding/decoding, when using binary XML. In addition, the data, even when using a binary XML technique, is not fully compressed to the smallest file size because many tags are repeated. This can be illustrated by the case in which many data records which use the same tags are contained in a single XML file. In such a case, even though a text based tag like <lastname> may be replaced by a numeric value when encoded, there will still be multiple instances of the same tag being repeated.

Thus, there is a need for a technique to encode data more efficiently and into smaller file sizes.

SUMMARY

According to some embodiments of the invention, markup-language documents are converted into a compacted markup-language form through the use of at least one parameterized macros. The macro is used to replace elements found in a markup-language document with a more compact form. The parameterized macro expands into an ordered set of elements (tag and/or data elements) including at least some parameter data given as a parameter to the macro. In this way, markup-language data is compacted.

The definition of a parameterized macro is found in either a static dictionary or a dynamic dictionary. If the definition is in a dynamic dictionary, the definition is, in some embodiments, transmitted with the compacted markup-language data. In some cases the macros used will be a mix of macros defined dynamically and additional macros defined in a static dictionary.

Compacted markup-language documents can then be converted into uncompacted markup-language form by using the macro definition in order to expand the macro and parameters contained in the compacted markup-language data into the series of elements that they represent.

These and other embodiments are described more fully below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
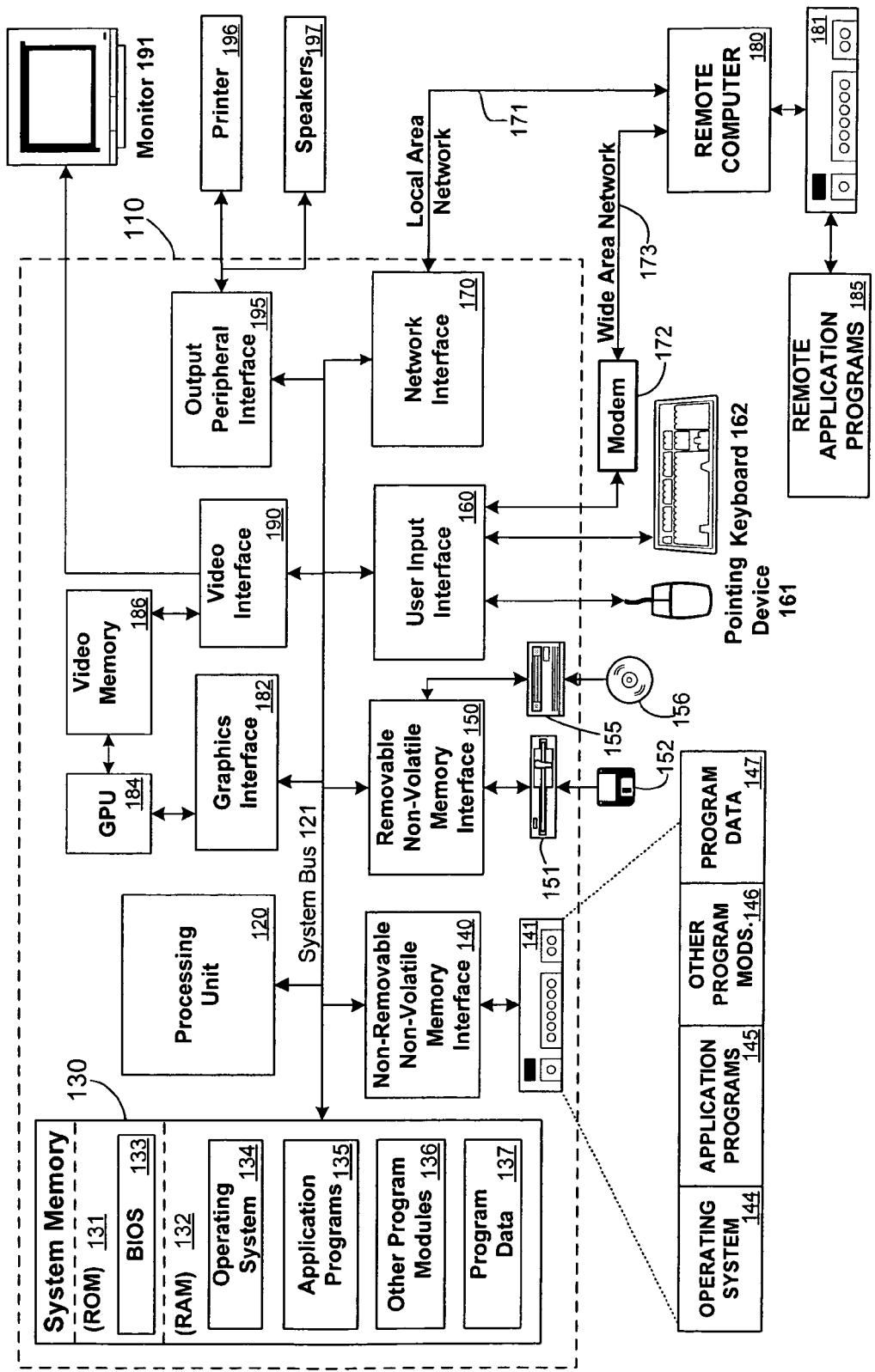
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Computing environment 100 typically includes at least some form of computer readable media. Computer readable media can be any available media that can be accessed by computing environment 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Encoding Markup Language Documents Using Parameterized Macros

Figure 2:
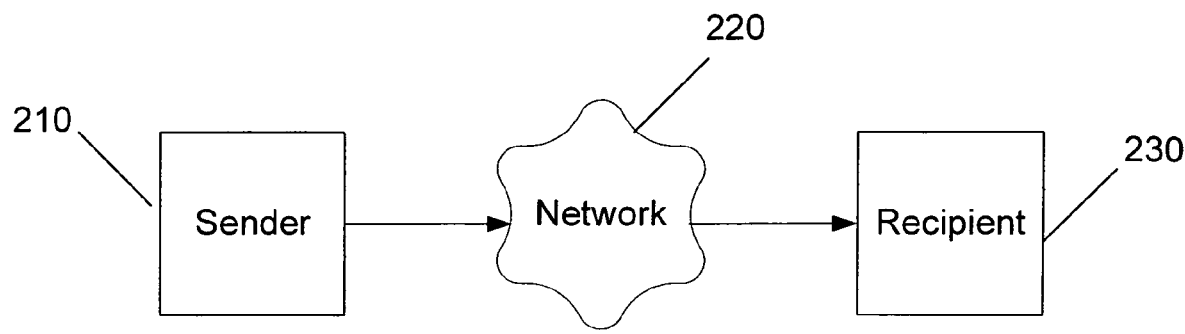
FIG. 2 is a block diagram of an exemplary system in which the invention can be implemented.

With reference to FIG. 2, an exemplary system in which the invention can be implemented includes a sender 210, a network 220, and a recipient 230. The sender 210 and recipient 230 are connected via a network 220, which may consist of private network(s) (e.g. LAN) and/or public networks (e.g. the Internet). In one embodiment of the invention, sender 210 compresses a markup language document for transmission using one or more parameterized macros. In one embodiment of the invention, recipient 230 receives a compressed markup language document and uses one or more parameterized macros referred to in the compressed document to uncompress the document for use. A macro, in general, includes information about how to use parameters to generate a sequence. No restriction on macro types is intended—without limitation, simple macros are contemplated which simply contain a definition showing how the parameters should be used to generate a sequence. Additionally, executable macros are contemplated, for example, a macro expressed as or including code which, when run, yields the sequence.

Figure 3:
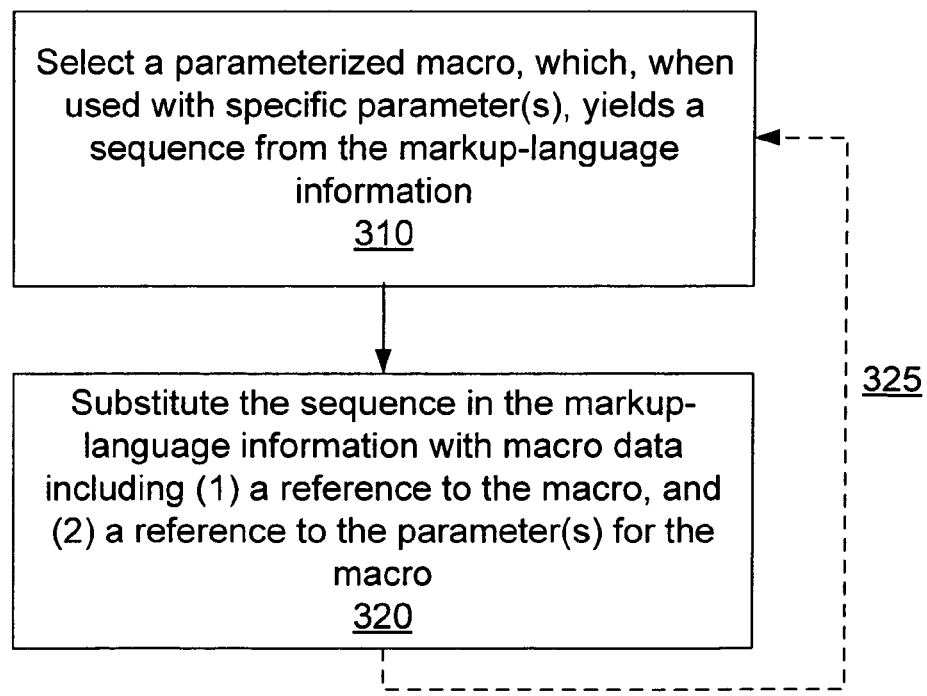
FIG. 3 is a flow diagram of a method for encoding markup-language information.

In some embodiments, markup-language information is encoded for transmission by identifying at least one sequence (including a tag element and a data element) which can be encoded using a parameterized macro. FIG. 3 is a flow diagram of a method for encoding markup-language information. As shown in FIG. 3, in a first step 310, a parameterized macro corresponding to a sequence in the markup language document is selected. The parameterized macro chosen is one that takes one or more parameters including a data element from the sequence, and when the macro, when used with the parameter(s), yields the sequence. In a second step 320, the sequence in the markup-language information is substituted with a reference to the macro and to the parameters (substituting the sequence in the markup-language information with a reference to the macro and to the parameters for the macro.)

In step 310, the selection of the macro may be a selection of a macro from a pre-existing group of macros. For example, a static dictionary known to the sender and assumed to be known by the recipient may be the source of the macro selected. Alternately, the selection of the macro may be generated in order to correspond to the sequence. For example, if the markup-language information contains several similar sequences which differ only by a data element, then a macro may be created which, when used with the data element as a parameter, generates the correct sequence. In such a case, such a macro can be used to replace each such sequence (with different parameters to generate the sequences correctly.)

In some embodiments, where a macro is generated and is not part of a static dictionary, the macro definition may be included in the compressed markup-language information which is transmitted. More generally, a definition for any macro which the recipient will need to expand the markup-language information can be included as part of the compressed markup-language information. Alternately, such definitions may be disclosed to the recipient in other ways. For example, a separate dictionary file may be disclosed to the recipient. For example, if many markup-language files have been compressed and a common set of macros have been used which are not part of a static dictionary available to the recipient, the common set of macros needs to be transmitted to the recipient only once. Transmitting the common set of macros to the recipient in a separate dictionary file or in only one of the compressed files is sufficient. In this way, the recipient will have information regarding macros used without requiring the transmission of multiple copies of the same macro definitions. These techniques of disclosing the macro definitions are not mutually exclusive but can be used together as appropriate.

The steps 310 and 320, as shown by arrow 325, can be performed iteratively, with several sequences being replaced. Arrow 325 is shown as dashed because this iteration is not present in all embodiments. A lossless data compression algorithm, such as a variation on the Lempel Ziv Welch (LZW) algorithm, may be used in order to facilitate the process by choosing which sequences from the data to compress or how to generate macros which will provide better compression.

While the initial sequence replaced is made up of elements of the markup language, as the iterations continue, the compressed markup-language information will include macro references. Such macro references may also be included in a sequence which is replaced by a macro reference. In addition to the use of parameterized macros as shown in FIG. 3, nonparameterized macros may also be used to compress markup-language information. Additionally, tokenization may be used to further compress markup-language information. Tokenization may occur before the process of substituting sequences with macro references and parameters or afterwards.

As an example of the compression process, consider the following markup-language data:

```
<file>
    <record>
        <firstname>John</firstname>
        <lastname>Adams</lastname>
        <birthyear>1735</birthyear>
        <inauguration_year>1797</inauguration_year>
    </record>
    <record>
        <firstname>John</firstname>
        <lastname>Hancock</lastname>
        <birthyear>1737</birthyear>
    </record>
    <record>
        <firstname>Thomas</firstname>
        <lastname>Paine</lastname>
        <birthyear>1737</birthyear>
    </record>
    <record>
        <firstname>Patrick</firstname>
        <lastname>Henry</lastname>
        <birthyear>1735</birthyear>
    </record>
</file>
```

(Indentation is not meaningful in this example but is given in order to facilitate understanding.) It can be seen that this file contains four records, each containing a firstname, a lastname, and a birthyear. In addition, one record contains an inauguration_year. In one example, in step 310, a macro is selected to correspond to the sequence: "<record><firstname>John</firstname><lastname>Adams</lastname><birthyear>1735</birthyear>" This macro M1 when used with parameters p1, p2, p3 yields "<record><firstname> p1 </firstname><lastname> p2 </lastname><birthyear> p3 </birthyear>" This macro may either be an existing macro or may be created specifically to be applied. When p1 is "John", p2 is "Adams" and p3 is "1735", the macro yields the correct sequence. In step 320, sequence is substituted in the markup-language information with the macro reference and parameter information. Thus, the revised markup-language information is:

```
<file>
    M1 John Adams 1735
        <inauguration_year>1797</inauguration_year>
    </record>
    <record>
        <firstname>John</firstname>
        <lastname>Hancock</lastname>
        <birthyear>1737</birthyear>
    </record>
    <record>
        <firstname>Thomas</firstname>
        <lastname>Paine</lastname>
        <birthyear>1737</birthyear>
    </record>
    <record>
        <firstname>Patrick</firstname>
        <lastname>Henry</lastname>
        <birthyear>1735</birthyear>
    </record>
</file>
```

This macro M1 can also be used in order to substitute in three other places (each of the sequences beginning with <record> and ending with </birthyear>. The result after three additional substitutions is:

```
<file>
    M1 John Adams 1735
        <inauguration_year>1797</inauguration_year>
    </record>
    M1 John Hancock 1737
    </record>
    M1 Thomas Paine 1737
    </record>
    M1 Patrick Henry 1735
    </record>
</file>
```

An additional two substitutions can be made using another macro M2, which when used with parameters p4 and p5 yields "M1 p4 p5 1737 </record>". This yields compressed markup-language information as follows:

```
<file>
    M1 John Adams 1735
        <inauguration_year>1797</inauguration_year>
    </record>
    M2 John Hancock
    M2 Thomas Paine
    M1 Patrick Henry 1735
    </record>
</file>
```

In this example it can be seen that the size of the markup-language information is greatly reduced. Generally, the number and length of repeated sequences that are present in the markup-language information initially is directly related the benefit in substituting macro references for sequences. Tokenization and other techniques can be used in order to further compress the size of the compressed markup-language information.

Figure 4:
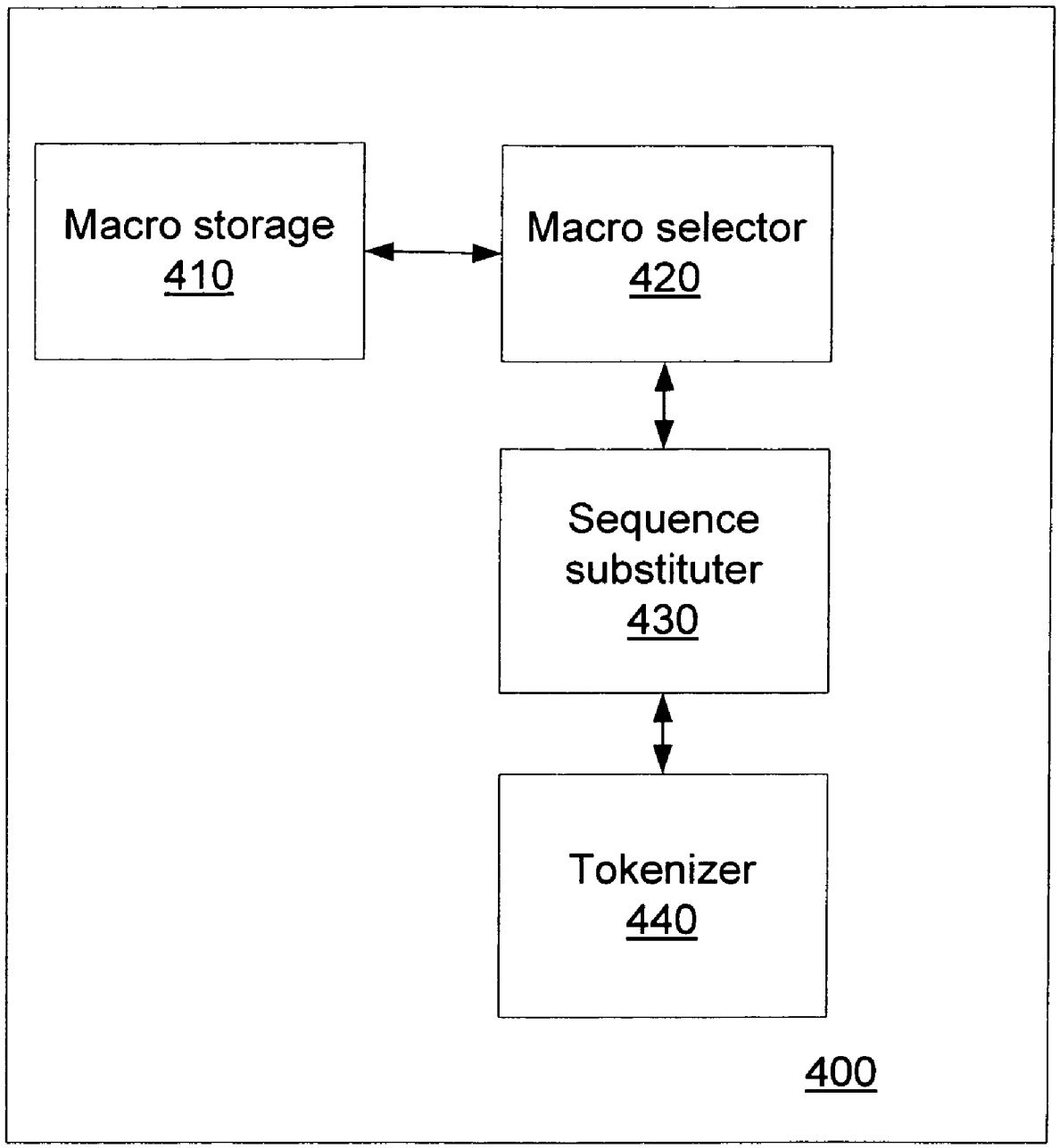
FIG. 4 shows a system for preparing markup-language information for transmission according to one embodiment of the invention.

FIG. 4 shows a system for preparing markup-language information for transmission according to one embodiment of the invention. As shown, system 400 includes macro storage 410, macro selector 420, and sequence substituter 430. The macro storage 410 stores macros for use in compressing markup-language information. The macro selector 420 selects a macro for use in substituting a sequence in the markup-language information with a reference to a macro and parameter(s). The sequence substituter 430 makes the substitution. Macro selector 420 may also generate a macro and store it in macro storage 410, and then select that macro for use to substitute a sequence. Macro storage 410 may be loaded with the contents of one or more static dictionaries. Several sequences may be replaced by sequence substituter 430, including sequences that include macros placed there previously by sequence substituter 430. Additionally, in one embodiment, a tokenizer is used to tokenize the revised markup-language information.

Decoding Markup Language Documents Using Parameterized Macros

Figure 5:
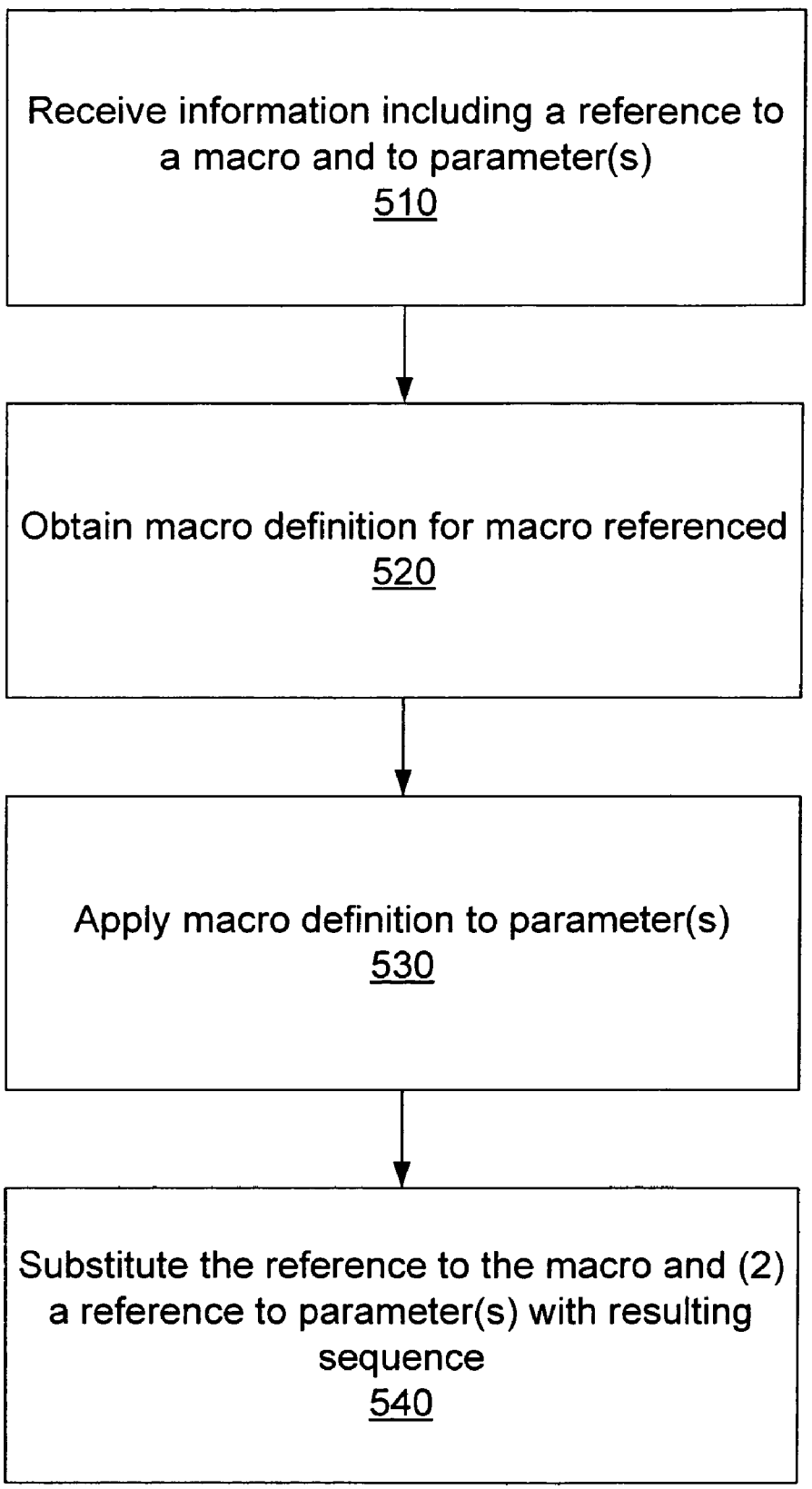
FIG. 5 is a flow diagram depicting the decoding of compressed markup-language documents according to one embodiment of the invention.

In order to decode the compressed markup-language information, the definitions of the macros referenced in the compressed markup-language information are used to produce sequences which are substituted for the macro data (macro reference and parameter reference(s)) in the compressed markup-language information. FIG. 5 is a flow diagram depicting the decoding of compressed markup-language documents according to one embodiment of the invention. As shown in FIG. 5, in step 510, information including macro data (a macro reference and parameter reference(s)) is received.

In step 520, a macro definition for the macro referenced is obtained. The macro may be obtained from a static dictionary. Alternately, the macro may be obtained from some definition included in the compressed markup-language document, from a related data file, or from some other source.

In step 530 the macro definition is applied, yielding a result sequence, which in step 540, that result sequence is substituted into the information. These steps may be performed iteratively in order to "uncompress" a number of macro references via substitution.

Where the compressed markup-language document has been tokenized, the step 510 of receiving the information further comprises expanding the tokens—in effect reversing the tokenization process—in order to yield the pre-tokenized document.

The steps 510, 520 and 530 can be performed iteratively, with several sequences being replaced. Where a reference to a nonparameterized macro is present in the compressed markup-language document, the reference to the nonparameterized macro is also expanded by substitution according to the macro definition.

A system including a decoder can be used in order to decode the encoded document. Because the macros must be applied in order to yield the markup-language document in its intended form, the macros can be said to be driving the decoder.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for encoding markup-language information comprising a data element for transmission from a sender, where said markup-language information comprises an information sequence, said information sequence comprising at least two ordered elements, said at least two ordered elements comprising the at least one data element and at least one tag element associated with each data element, the method comprising:

selecting, from a set of macros, a first macro corresponding to said information sequence, where said first macro takes at least one parameter of a first parameter set, and where using at least one specific data element from among said at least one data elements for each of said at least one parameter to said first macro yields said information sequence;

substituting said information sequence in said markup-language information with macro data comprising a reference to said first macro and to said specific data elements in said markup-language information, said substitution resulting in modified markup-language information, where said modified markup-language information comprises a second sequence comprising at least two second sequence elements, where each of said second sequence elements comprise a reference to a macro, a data element, or a tag element associated with a data element;

selecting a second macro from said set of macros where said second macro, when applied to a second parameter set comprising one or more specific parameters, yields said second sequence;

substituting said second sequence in said modified markup-language information with second macro data comprising a reference to said second macro and said second parameter set; and transmitting the modified markup-language information to a recipient.

2. The method of claim 1, where said selection of a first macro comprises:
selecting a pre-existing macro from a set of at least one pre-existing macros.

3. The method of claim 2 where said set of pre-existing macros is a static dictionary comprising the set of macros, where said static dictionary is available to a recipient of said transmission.

4. The method of claim 1, where said step of selecting a first macro comprises:
generating said first macro corresponding to said information sequence.

5. The method of claim 1, further comprising:
adding definition for said first macro to said modified markup-language information.

6. The method of claim 1, where said steps of selecting a first macro for the information sequence and substituting said information sequence with a reference to said first macro and said specific data elements are performed iteratively for at least two sequences in said markup-language information.

7. The method of claim 1, further comprising:
tokenizing said modified markup-language information, said tokenization comprising using a token to represent said macro in said macro data.

8. A system for preparing markup-language information for transmission comprising a data element, where said markup-language information comprises an information sequence, said information sequence comprising at least two ordered elements, said at least two ordered elements comprising the at least one data element and at least one tag element associated with each data element, the system comprising:
a computing processor;
macro storage communicatively coupled with the computing processor for storing a set of macros, where each of said macros takes at least one element as a parameter;
macro selector for selecting a first specific macro from said set of macros, where said first specific macro, when applied to a first parameter set comprising one or more specific parameters, yields said information sequence;
sequence substituter for substituting said information sequence with macro data comprising a reference to said first specific macro and to said first parameter set, yielding revised markup-language information, where said revised markup-language information comprises a second sequence, where said macro selector selects a second specific macro from said set of macros where said second specific macro, when applied to a second parameter set comprising one or more specific parameters, yields said second sequence, and where said sequence substituter substitutes said second sequence in said revised markup-language information with second macro data comprising a reference to said second specific macro and said second parameter set; and
a transmitter for transmitting the revised markup-language information to a recipient.

9. The system of claim 8, where said macro storage comprises a set of at least one pre-existing macros.

10. The system of claim 9 where said set of pre-existing macros is a static dictionary comprising a set of pre-defined macros, where said static dictionary is available to a recipient of said transmission.

11. The system of claim 8, where said macro selector further generates said first specific macro corresponding to said information sequence and stores said first specific macro in said macro storage.

12. The system of claim 8, further comprising:
tokenizer for tokenizing said revised markup-language information, said tokenizer substituting a token representing said macro for said macro reference in said revised markup-language information.

13. A computer-readable storage medium having computer-readable instructions stored thereon, the computer-readable instructions when executed by a computer performing a method for encoding markup-language information comprising a data element for transmission from a sender, where said markup-language information comprises an information sequence, said information sequence comprising at least two ordered elements, said at least two ordered elements comprising the at least one data element and at least one tag element associated with each data element, the method comprising:
selecting, from a set of macros, a first macro corresponding to said information sequence, where said first macro takes at least one parameter of a first parameter set, and where using at least one specific data element from among said at least one data elements for each of said at least one parameter to said first macro yields said information sequence;
substituting said information sequence in said markup-language information with macro data comprising a reference to said first macro and to said specific data elements in said markup-language information, said substitution resulting in modified markup-language information, where said modified markup-language information comprises a second sequence comprising at least two second sequence elements, where each of said second sequence elements comprise a reference to a macro, a data element, or a tag element associated with a data element;
selecting a second macro from said set of macros where said second macro, when applied to a second parameter set comprising one or more specific parameters, yields said second sequence;
substituting said second sequence in said modified markup-language information with second macro data comprising a reference to said second macro and said second parameter set; and
transmitting the modified markup-language information to a recipient.

14. The computer-readable storage medium of claim 13, said selection of a first macro comprises: selecting a pre-existing macro from a set of at least one pre-existing macros.

15. The computer-readable storage medium of claim 14 where said set of pre-existing macros is a static dictionary comprising a set of macros, where said static dictionary is available to a recipient of said transmission.

16. The computer-readable storage medium of claim 13, further comprises:

obtaining a macro definition from said information sequence.

17. The computer-readable storage medium of claim 13, comprises:

expanding tokens in said information sequence.

* * * * *